US007573879B2

(12) United States Patent
Narad et al.

(10) Patent No.: US 7,573,879 B2
(45) Date of Patent: Aug. 11, 2009

(54) METHOD AND APPARATUS FOR GENERATING A HEADER IN A COMMUNICATION NETWORK

(75) Inventors: Charles Narad, Los Altos, CA (US); Joseph Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 10/934,271

(22) Filed: Sep. 3, 2004

(65) Prior Publication Data

US 2006/0050739 A1     Mar. 9, 2006

(51) Int. Cl.
*H04L 12/56* (2006.01)
*H04L 12/66* (2006.01)

(52) U.S. Cl. .................. 370/392; 370/401; 370/474

(58) Field of Classification Search .......... None
See application file for complete search history.

(56) References Cited

U.S. PATENT DOCUMENTS

| 5,353,282 | A | 10/1994 | Dormer et al. |
| 5,574,934 | A | 11/1996 | Mirashrafi et al. |
| 5,625,779 | A | 4/1997 | Solomon et al. |
| 5,740,385 | A | 4/1998 | Hayek et al. |
| 5,742,603 | A | 4/1998 | Shafir et al. |
| 5,745,837 | A | 4/1998 | Fuhrmann |
| 5,953,338 | A | 9/1999 | Ma et al. |
| 6,081,848 | A | 6/2000 | Grun et al. |
| 6,212,589 | B1 | 4/2001 | Hayek et al. |
| 6,266,345 | B1 | 7/2001 | Huang |
| 6,285,659 | B1 | 9/2001 | Feuersraeter et al. |
| 6,317,803 | B1 | 11/2001 | Rasmussen et al. |
| 6,393,506 | B1 | 5/2002 | Kenny |
| 6,442,632 | B1 | 8/2002 | Hayek et al. |
| 6,512,767 | B1 | 1/2003 | Takeda et al. |
| 6,647,474 | B2 | 11/2003 | Yanai et al. |
| 6,691,192 | B2 | 2/2004 | Ajanovic et al. |
| 7,110,398 | B2 * | 9/2006 | Grand et al. ............. 370/389 |
| 2003/0043848 | A1 | 3/2003 | Sonksen |
| 2004/0109473 | A1 | 6/2004 | Lebizay et al. |

(Continued)

FOREIGN PATENT DOCUMENTS

EP     1 093 266 A2     4/2001

(Continued)

OTHER PUBLICATIONS

Advanced Switching Core Architecture Specification Revision 1.0—Dec. 2003—ASI-SIG.

(Continued)

*Primary Examiner*—Chi H. Pham
*Assistant Examiner*—Soon D. Hyun
(74) *Attorney, Agent, or Firm*—Guojun Zhou

(57) ABSTRACT

Embodiments are generally direct to a method and apparatus for generating a header in a communication network. In one embodiment, receiving at a node on a first communication link a protocol data unit (PDU), generating a header that is non-specific to a particular communication protocol associated with the PDU when received at the node, the header to facilitate encapsulation and transportation of the PDU through a second communication link to deliver the PDU to a memory-based service interface of another node on the second communication link.

30 Claims, 8 Drawing Sheets

U.S. PATENT DOCUMENTS

| | | | |
|---|---|---|---|
| 2004/0184479 A1* | 9/2004 | Yamauchi et al. | 370/466 |
| 2004/0252717 A1* | 12/2004 | Solomon et al. | 370/466 |
| 2005/0005033 A1* | 1/2005 | Powell et al. | 710/5 |
| 2005/0025178 A1* | 2/2005 | Shirota et al. | 370/466 |
| 2005/0210177 A1* | 9/2005 | Norden | 710/317 |

FOREIGN PATENT DOCUMENTS

| | | |
|---|---|---|
| EP | 1093266 A2 | 4/2001 |
| EP | 1093266 A3 | 4/2001 |
| EP | 1 109 419 A2 | 6/2001 |
| KR | 2001-0052354 | 6/2001 |
| WO | WO 02/15469 A | 2/2002 |
| WO | WO 02/15469 A2 | 2/2002 |

OTHER PUBLICATIONS

PCI Express Base Specification Revision 1.0a—Apr. 15, 2003, PCI Express.

InfiniBand Architecture Specification vol. 1—Release 1.1—Nov. 6, 2002 Final.

InfiniBand Architecture Specification vol. 2—Release 1.1—Nov. 6, 2002 Final.

European Patent Office, Communication Pursuant to Article 96(2) EPC, Office Action for Application No. 05789105.3, filed Aug. 12, 2005. pp. 1-7, Sep. 28, 2007.

Wong—Jun. 23, 2003—pp. 36 and 38—Advanced Switching for PCI Express: The Future Looks "Fabric" Fast.

PCT/US2005/028975—Aug. 12, 2005—ISR and WO Mailed Dec. 21, 2005.

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Seg. Code | | | | G/E | | Mem-based Serv. Interface Identifier | | | | | | | | | | | | PDU Sequence Number | | | | | | PI / Sequence Number | | | | | | | |

| Seg. Code Encodings | Description |
|---|---|
| 0000 | Singleton |
| 0001 | Initial |
| 0010 | Singleton with PrePad |
| 0100 | Singleton with EndPad |
| 0101 | Initial with PrePad |
| 0110 | Singleton with Both PrePad and EndPad |
| 100- | Intermediate |
| 110- | Terminal |
| 111- | Terminal with EndPad |

| G/E Encodings | Description |
|---|---|
| 00 | Dword granularity no byte reverse |
| 10 | Byte granularity, no byte reverse |
| 11 | Byte granularity, byte reverse |

METHOD AND APPARATUS FOR GENERATING A HEADER IN A COMMUNICATION NETWORK

TECHNICAL FIELD

Embodiments of the invention generally relate to the field of electronic systems, and more particularly, to a method and apparatus for generating header in a communication network.

BACKGROUND

Communication links in communication networks are often constructed of specialized packet switching networks which move data and/or instructions (hereinafter referred to as "data") between endpoints on a communication link. The endpoints on these communication links may receive data associated with a particular communication protocol and transport the data to other endpoints. After receiving data associated with a particular communication protocol, the endpoints may also add additional communication protocols that provide switching or routing functionality such as classes of service, prioritization, data integrity, congestion management, flow control and link management. The addition of these functionalities result in a level of complexity that is further compounded by a large number of possible communication protocols associated with data when received by an endpoint on a communication link.

BRIEF DESCRIPTION OF THE DRAWINGS

The invention is illustrated by way of example, and not by way of limitation, in the figures of the accompanying drawings in which like reference numerals refer to similar elements and in which:

FIG. 4 is a graphical illustration of a transport services header, according to an embodiment of the invention;

FIG. 5*a* is a table illustration of encodings for a transport services header, according to one embodiment of the invention;

FIG. 5*b* is a table illustration of granularity/endian (G/E) encodings for a transport services header, according to an embodiment of the invention;

DETAILED DESCRIPTION

Embodiments of the invention are generally directed to a method and apparatus for generating a header in a communication network. In accordance with one example embodiment, a transport services manager is introduced herein. As described more fully below, the innovative transport services manager is responsive to a node on a communication link and is operable to generate and/or process a header that is non-specific to a particular communication protocol associated with a protocol data unit (PDU) received by the node, the header to facilitate encapsulation and transportation of the PDU through the communication link to deliver the PDU to a memory-based service interface of another node on the communication link.

Figure 1:
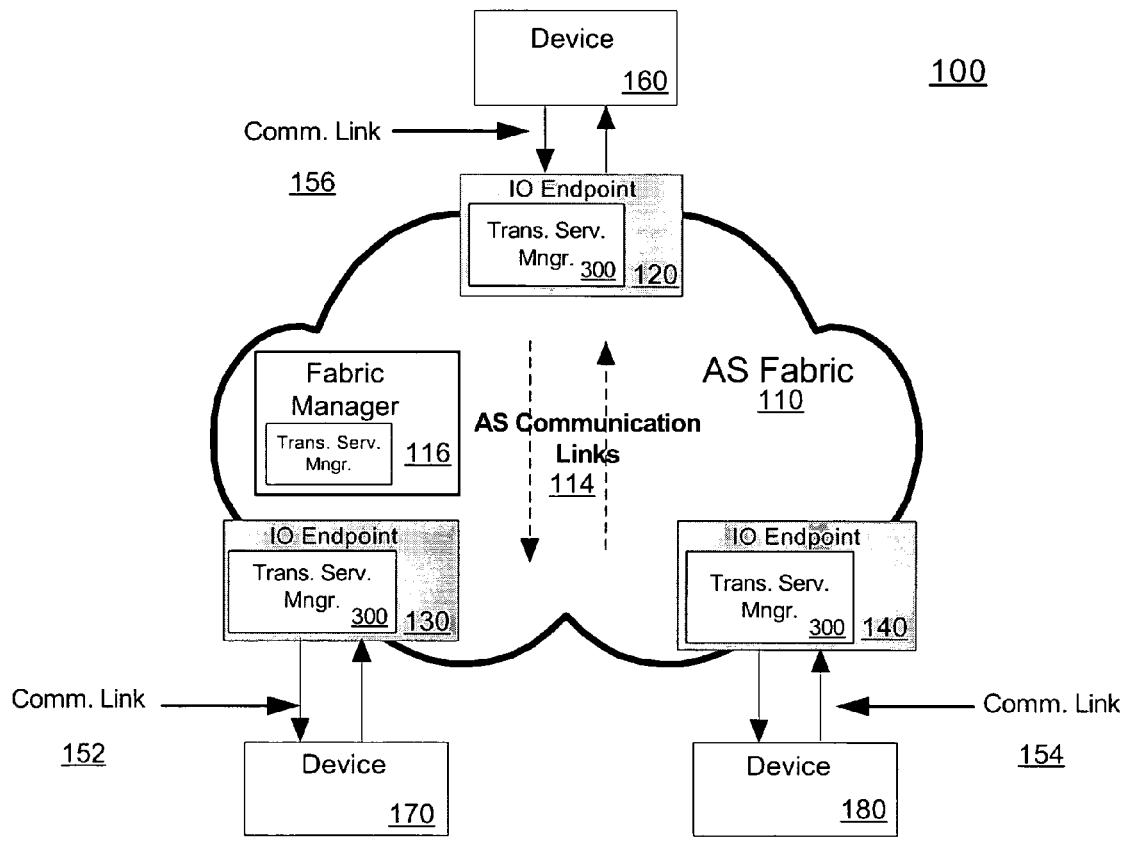
FIG. 1 is a graphical illustration of an electronic system according to one embodiment of the invention.

FIG. 1 is a graphical illustration of an electronic system according to one embodiment of the invention. In FIG. 1, advanced switching (AS) fabric 110, input/output (IO) endpoints 120, 130, and 140, devices 160, 170 and 180, communication links 152, 154 and 156 are each coupled as depicted. Also shown in FIG. 1 is AS fabric 110, which includes a fabric manager 116 and AS communication links 114.

As will be developed more fully below, according to an embodiment, arbitrary data is received by IO endpoint 130 on a communication link 152 from device 170. Alternatively the arbitrary data may originate at processing element located within endpoint 130. Arbitrary data may be data and/or instructions (hereinafter referred to as "data") transmitted from a device (e.g. device 170) in a communication protocol format that may correspond to or be associated with various communication protocols (e.g. Ethernet, Sonet, ATM, TCP/IP, etc.). This data is transmitted in the form of a data packet that may include a header specific to a particular communication protocol and is hereinafter referred to as a "protocol data unit" or "PDU". The header in the PDU is hereinafter referred to as the "PDU header" and the data in the PDU is hereinafter referred to as the "PDU payload."

In an alternative embodiment, a PDU may not contain a header when received at an IO endpoint on AS fabric 110. For example, the PDU may comprise only a PDU payload that was created by a processing unit within an IO endpoint on AS fabric 110. In this example, the PDU may be associated with communication protocols that are specific to the transportation services offered by AS fabric 10 to transport the PDU across AS fabric 10. In this example, the PDU comprises only a PDU payload that may have been created by a processing unit within an IO endpoint on AS fabric 110.

In accordance with this example embodiment, a PDU from device 170 is destined for device 160. The PDU contains a PDU payload that may be, for example, commands, instructions, requests for information, multimedia content, etc. to be handled by device 160. The PDU also contains a PDU header that is associated with a particular communication protocol and the PDU header may also contain information that is associated with bridging or tunneling of the particular communication protocol across AS fabric 110.

To facilitate the efficient reception of the PDU by device 160, the PDU remains in relatively the same communication protocol format (the portions of the PDU header associated with the particular communication protocol and the PDU payload remain intact) after being transported across AS fabric 110.

FIG. 1 shows that to reach device 160, the PDU follows a route that will transport the PDU from IO endpoint 130 across AS fabric 110 via AS communication links 114 to IO endpoint 120.

In an example embodiment, the PDU is delivered to a memory-based service interface of IO endpoint 120. In an example implementation, the memory-based service interface may be a transmit and/or a receive buffer (e.g. a first-in-first-out (FIFO buffer), a processing element, or a shared-memory, all of which may be responsive to an egress IO endpoint on AS fabric 110. The PDU may then be transmitted to device 160 from the memory-based service interface of IO endpoint 120 via communication link 156 or device 160 may access the PDU in the memory-based service interface of IO endpoint 120 via communication link 156.

Since the PDU is delivered to device 160 in relatively the same communication protocol format as it was transmitted from device 170, the PDU is transported across AS fabric 110 from IO endpoint 130 to IO endpoint 120 in a process called "encapsulation." As will be described in more detail below, an encapsulation format that includes a header that is non-specific to a particular protocol associated with a received PDU (hereinafter referred to as a "transport services header") is utilized to facilitate the efficient transportation of the received PDU across AS fabric 110.

AS fabric 110, according to an embodiment, is operated in compliance with the Advanced Switching Core Architecture Specification, Rev. 1.0, published December 2003, hereinafter referred to as "the AS Core Specification". AS route headers, as described in the AS Core Specification and in more detail below, are used by IO endpoints on AS fabric 110 to route a PDU via AS communication links 114 to one or more other IO endpoints on AS fabric 110.

In an example embodiment, IO endpoint 130 encapsulates the PDU using an encapsulation format to efficiently transport the PDU to another endpoint on AS fabric 110, as described in more detail below. Once the PDU is received by IO endpoint 120, the headers specific to AS fabric 110 are removed and the PDU is transmitted or made accessible to device 160 in relatively the same communication protocol format as received by IO endpoint 130.

In addition to AS route headers, specific transport services are described in the AS Core Specification relating to fabric transportation services such as congestion management, multicast and segmentation and reassembly (SAR), although the invention is not limited to these transportation services. The AS Core Specification further associates these transportation services with particular protocol interfaces (PIs).

In an example embodiment, to assist in the efficient use of one or more PIs on AS fabric 110, a transport services manager 300 is utilized. As shown in FIG. 1, the functionality of transport services manager 300, may be included as a part of fabric manager 116 and/or may be located within and/or responsive to an IO endpoint on AS fabric 110.

Transport services manager 300, as will be described in more detail below, may generate a transport services header on AS fabric 110 that is non-specific to a particular communication protocol associated with a PDU received by IO endpoint 130 or a PDU generated at the endpoint 130. This generic transport services header will facilitate encapsulation and transportation of the PDU across AS fabric 110 to deliver the PDU to a memory-based service interface of IO endpoint 120.

In an example embodiment, to efficiently transport a PDU across AS fabric 110, a SAR transportation service is used. SAR is used, for example, if the PDU exceeds the allowed payload size for an encapsulated PDU transported across AS fabric 110. In that regard, as described in more detail below, a PDU sent from device 170 that exceeds the allowable payload size is sliced into smaller segments by IO endpoint 130 to fit the resulting segments within the allowable payload.

Transport services manager 300, as described in more detail below, facilitates this segmentation process by the generation of a generic transport services header to be included with each encapsulated PDU segment transported via AS communication links 114 across AS fabric 110 to a memory-based service interface of IO endpoint 120. The segments are then reassembled by IO endpoint 120 to deliver and/or transmit the PDU to device 160 in relatively the same format as received at IO endpoint 130.

In an alternative embodiment, IO endpoint 130 may be the destination for a PDU. In that case, a reassembled PDU is not forwarded to a remote device 160.

Figure 2:
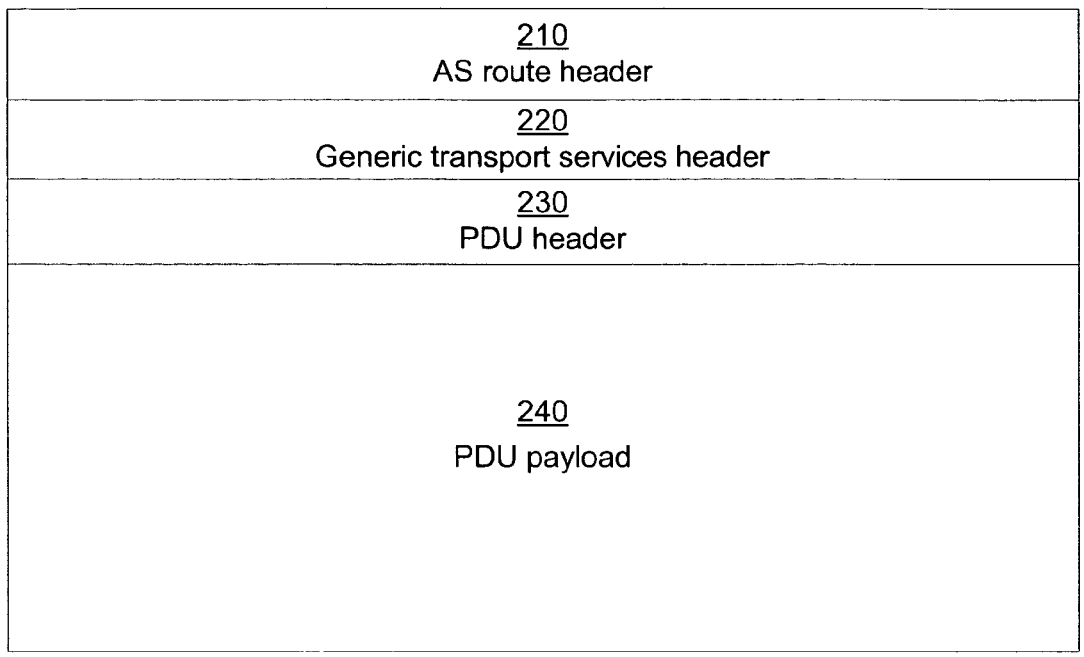
FIG. 2 is a graphical illustration of an encapsulated protocol data unit (PDU), according to one embodiment of the invention.

FIG. 2 is a graphical illustration of an encapsulated PDU, according to one embodiment of the invention. In FIG. 2, an encapsulated PDU is depicted in an AS fabric carrier protocol 200.

AS fabric carrier protocol 200 includes an AS route header 210, generic transport services header 220, PDU header 230 and PDU payload 240. As introduced above, AS route headers in a format described in the AS Core Specification are used by IO endpoints on AS fabric 110 to efficiently route an encapsulated PDU via AS communication links 114 to an egress IO endpoint on AS fabric 110. In that regard, AS route header 210 is generated by an ingress IO endpoint on AS fabric 110 in accordance with the AS Core Specification.

Generic transport services header 220, as introduced above and described in more detail below, is generated by transport services manager 300 to facilitate the delivery of a PDU encapsulated in the format of AS fabric carrier protocol 200 to a memory-based service interface of an IO endpoint that is an egress IO endpoint on AS fabric 110.

PDU header 230 contains a header that is associated with the communication protocol and which is used to transmit the data contained in the PDU from a destination device to an ingress IO endpoint on AS fabric 110.

PDU payload 240 contains the contents transported within the PDU. These contents, in addition to data, may also include part or all of a higher-level protocol PDU and its associated higher-level protocol headers. PDU header 230 and PDU payload 240, once included within AS fabric carrier protocol 200, are hereinafter referred to as the "encapsulated PDU".

The AS Core Specification describes a header format that allows for the referencing of other headers in a process called "chaining," also known as a method of encapsulation. In an example embodiment, chaining is accomplished in AS fabric carrier protocol 200 by the lower numbered header referencing the higher numbered header. Thus, in AS fabric carrier protocol 200, AS route header 210 would be the lower numbered header and would chain to the higher numbered generic transport services header 220 by including a reference to generic transport services header 220. This process will continue down AS fabric carrier protocol 200 in FIG. 2 for each header contained within AS fabric carrier protocol 200.

In alternative embodiments, AS fabric carrier protocol 200 may contain more than the headers shown in FIG. 2 and may contain headers that are not specific to advanced switching. In that regard, each header positioned higher will chain to a header positioned lower. For example, transport service header 220 may further chain to a plurality of other, higher-level protocols such as hypertext markup language (HTML), remote procedure call (RPC), real-time transport protocol (RTP), etc.

In an example embodiment, each element in AS fabric carrier protocol 200 includes one or more "double-words," hereinafter referred to as a "dword". A dword indicates 32-bits of data that can be further divided into four 8-bit segments. AS fabric carrier protocol 200 may have a size limitation equal to a set number of dwords for each element and/or for all elements combined. This size limitation is determined either by the AS Core Specification or by other limitations such as those applicable to the physical capabilities of a specific AS fabric.

Figure 3:
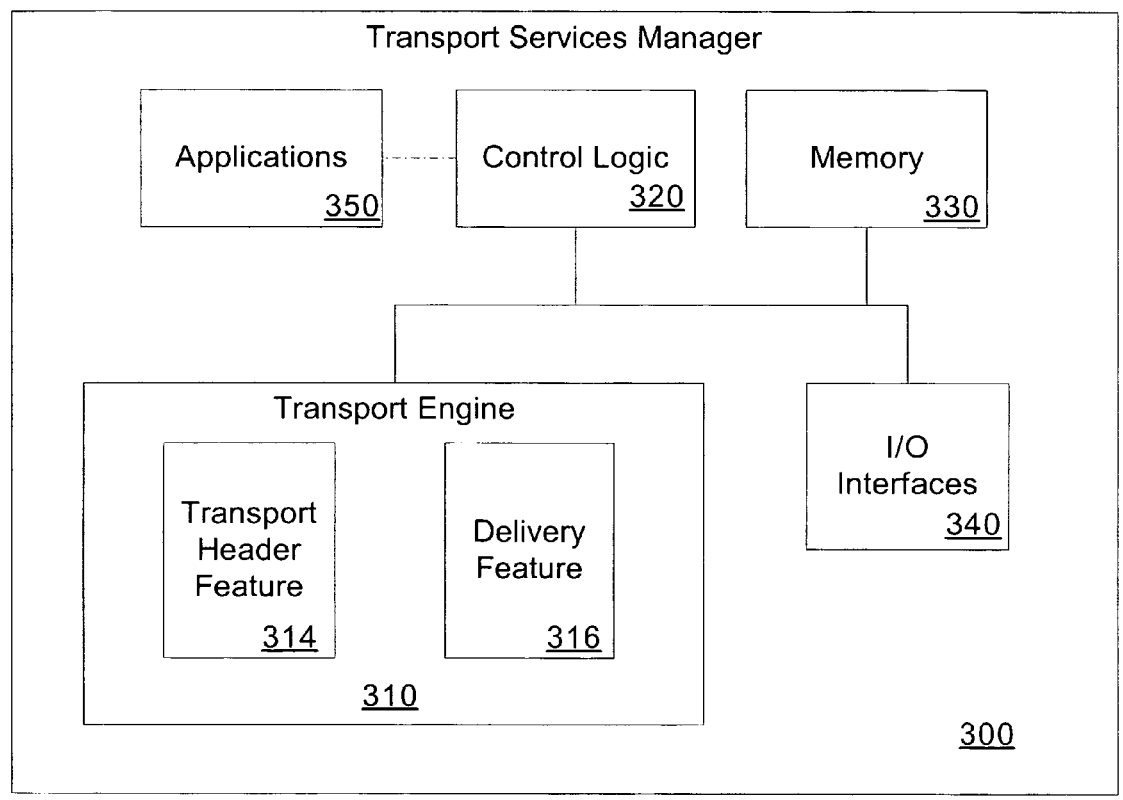
FIG. 3 is an architectural diagram of a transport services manager, according to one embodiment of the invention.

FIG. 3 is an architectural diagram of a transport services manager, according to one embodiment of the invention. Transport services manager 300 comprises a transport engine 310, control logic 320, memory 330, 10 interface 340, and optionally one or more applications 350, each coupled as depicted.

In FIG. 3, transport engine 310 includes a transport header feature 314, and delivery feature 316. As developed more fully below, transport header feature 314 and delivery feature 316 generate a transport services header to facilitate encapsulation and transportation of a PDU received at a node (e.g. IO endpoint 130) on a switch fabric (e.g. AS fabric 110) in a way that is generic to a communication protocol associated with the PDU. As a result, the efficient transportation of the PDU from the node through the switch fabric to a memory-based service interface of another node (e.g. endpoint 120) on the switch fabric may be accomplished.

As used herein, control logic 320 controls the overall operation of transport services manager 300 and is intended to represent any of a wide variety of logic device(s) and/or executable content to implement the operation of transport services manager 300, described herein. In this regard, control logic 320 may well be comprised of a microprocessor, network processor, microcontroller, field programmable gate array (FPGA), application specific integrated circuit (ASIC), or executable content to implement such control features, and/or any combination thereof. In alternate embodiments, the features and functionality of control logic 320 may well be implemented within transport engine 310.

In an example embodiment, control logic 320 invokes an instance of transport engine 310 to facilitate the generation of a transport services header for a PDU received at an IO endpoint on AS fabric 110. The generic transport services header facilitates encapsulation and transportation of the PDU through AS fabric 110 for delivery of the PDU to a memory-based service interface of another IO endpoint on AS fabric 110.

As used herein, memory 330 is intended to represent a wide variety of memory media including, but not limited to volatile memory, non-volatile memory, flash and programmatic variables or states.

According to an example embodiment, memory 330 is used to temporarily store tables containing encodings to generate generic transport services headers that are generic to a particular communication protocol associated with a PDU received by IO endpoint 130 on AS fabric 110. Memory 330 may also temporarily store encodings to facilitate the way an encapsulated PDU (e.g. PDU header 230 and PDU payload 240) is placed within an AS fabric carrier protocol in the format of AS fabric carrier protocol 200.

Memory 330 may also store executable content. The executable content may be used by control logic 320 to implement an instance of transport engine 310.

In an example embodiment, machine-readable instructions can be provided to memory 330 from a form of machine-accessible medium. As used herein, a machine-accessible medium is intended to represent any mechanism that provides (i.e., stores) information in a form readable by a machine or device (e.g. IO endpoint 130). For example, a machine-accessible medium may well include read only memory (ROM); random access memory (RAM); magnetic disk storage media; optical storage media; flash memory devices; and the like.

As used herein, IO interfaces 340 provides a communication interface between transport services manager 300 and an electronic system. For example, transport services manager 300 may be implemented as an element of a communication network, wherein I/O interfaces 340 provides a communication interface between transport services manager 300 and the communication network via a communication channel. In this regard, control logic 320 can receive a series of instructions from application software external to transport services manager 300 via I/O interfaces 340. The series of instruction may invoke control logic 320 to implement one or more features of transport engine 310.

In an example embodiment, transport services manager 300 may include one or more applications 350 to provide instructions to control logic 320. As used herein, such applications 350 may well be invoked to generate a user interface, e.g., a graphical user interface (GUI), to enable administration features, and the like. In alternate embodiments, one or more features of transport engine 310 may well be implemented as applications 350, invoked by control logic 320 to invoke such features.

In one embodiment, a PDU is received by an IO endpoint 130 on AS fabric 110 with a destination of device 160. IO endpoint 130 will encapsulate the PDU in the format of AS fabric carrier protocol 200 to transport the PDU across AS fabric 110 to IO endpoint 120 which will then transmit the PDU to the destination of device 160. Prior to encapsulation, IO endpoint 130 determines the total size of the PDU and compares that size to the size allowable for AS fabric carrier protocol 200. If the PDU exceeds the allowable size, then IO endpoint 130 will slice the PDU into smaller segments.

Once the PDU size is determined and the PDU is possibly segmented, transport engine 310 invokes an instance of transport header feature 314. Transport header feature 314, as explained in more detail below, accesses an encoding table in memory 330 to determine what encodings will apply to the generic transport services header. Once the encodings are determined, transport header feature 314 then populates the applicable fields of a generic transport services header (shown in FIG. 2 as generic transport services header 220).

Once the applicable fields of the generic transport services header are populated by transport header feature 314, transport engine 310 invokes an instance of delivery feature 316. Deliver feature 316, as will be explained in more detail below, formats or arranges the encapsulated PDU to facilitate the efficient delivery of the encapsulated PDU to a memory-based service interface of IO endpoint 120.

In an example embodiment, a transport services manager 300 may facilitate the delivery of an encapsulated PDU at an egress IO endpoint on AS fabric 110. In that regard, transport engine 310 invokes an instance of delivery feature 316 to read the transport services header of an encapsulated PDU when received by an egress 10 endpoint. Delivery feature 316 then facilitates the delivery of the PDU to the memory-based service interface of the egress 10 endpoint.

FIG. 4 is a graphical illustration of a transport services header, according to an embodiment of the invention. In FIG. 4, generic transport services header 400 is depicted. Generic transport services header 400 is a format designed to facilitate encapsulation of a PDU associated with various communication protocols. Accordingly, Generic transport services header 400 is non-specific or generic to a particular communication protocol possibly associated with a PDU received at a node on a switch fabric.

Generic transport services header 400 includes 32-bits of data. This 32-bits of data includes five fields; segmentation code, granularity/endian (G/E), memory-based service interface identifier, PDU sequence number and PI/segment sequence number.

The "segmentation code" field in bits 28-31 indicates the characteristics of the segment associated with a PDU. Bits 28-31 are selectively asserted based on the segmentation code encodings, as explained in table 510 of FIG. 5a.

The "G/E" field in bits 26 and 27 indicates the granularity and endian characteristics of the PDU as it is delivered to a memory-based service interface of an egress node on a switch fabric. In this regard, bits 26 and 27 are selectively asserted based on the G/E encodings, as explained in table 520 of FIG. 5b below.

In an example embodiment, transport engine 310 will selectively invoke an instance of transport header feature 314 which may read at least a portion of a PDU received by an IO endpoint on AS fabric 110 and determine the format of the data payload associated with the PDU. The format of the data payload may be based on the communication protocol associated with the received PDU or it may be based on statically configured information, or by information about the packet (hereinafter referred to as "metadata") that may include a derived packet length and/or the communication interface which is associated with the packet, The format of the data payload may contain a one or more dword PDU header, followed by a one or more dword PDU payload. The PDU header may contain information that is used by an egress transport services manager 300 to determine whether the PDU payload is to be delivered to the PDU's destination in a byte-stream or dword-stream manner. In that regard, bit 27 is asserted by transport header feature 314 if a byte-stream manner is indicated and is de-asserted if a dword-stream manner is indicated.

Transport header feature 314, if a byte-stream manner is indicated, may selectively assert bit 26 to indicate how a PDU is delivered into an egress IO endpoint's memory-based service interface after the PDU is transported across AS fabric 110. In that regard, if the PDU is transporting data in a byte-stream manner that is of the opposite byte-endianess (endianess being the most significant byte located on the left or right side of a dword) of how data is accessed/retrieved from the memory-based service interface, then transport header feature 314 will assert bit 26. This assertion of bit 26 will indicate that the payload data in the PDU is to be delivered into the memory-based service interface in a byte-reverse order.

The "memory-based service identifier" field in bits 14-27 indicates the location in the memory-based service interface to which the encapsulated PDU segment(s) is delivered. The memory-based service identifier further provides a handle or index for reassembly information associated with an ordered flow of received PDUs and PDU segments in which a generic transport services header in the format of generic transport services head 400 may indicate a particular memory-based service identifier.

In an example implementation, this identifier may be a configured delivery option to a particular queue maintained in a receive and/or a transmit buffer of an IO endpoint on AS fabric 110. In an alternate implementation, the identifier may be a configured delivery to a particular PI-specific processing unit responsive to an IO endpoint on AS fabric 110, although the invention is not limited to these two example implementations.

The "PDU sequence number" field in bits 7-13 indicates the position of a particular PDU in a sequence of PDUs that are transported on a switch fabric. For example, a sequence of multimedia audio frames is sent from device 170 to device 160 through AS fabric 110. In this example, the first PDU received by IO endpoint 130 is encapsulated and sent to a memory-based service interface of IO endpoint 120 with a PDU sequence number of '0' assigned to it, and for each subsequent PDU associated with the multimedia audio frames this value is incremented by '1'. All segments of the same PDU carry the same PDU sequence number. The PDU sequence number wraps, that is an increment from the maximum value results in a value of '0' and '0' is considered the next sequential value following the maximum value that the field can represent.

The "PI/sequence number" field in bits 0-6 indicates either a communication protocol(s) associated with the PDU (e.g. Ethernet, ATM, IP, SONET, etc.) or the sequence number of a segment of the PDU if the PDU is sliced into segments by an IO endpoint prior to transportation across AS fabric 110 to another IO endpoint. In that regard, the sequence number of a segment is an aspect of the point-to-point communication link between IO endpoints on AS fabric 110 and is used to facilitate the transportation of intermediate and last (hereinafter referred to as "terminal") segments of a PDU across AS fabric 110.

In an example embodiment, a generic transport services header in the format of generic transport services header 400 is associated with the initial segment of a PDU that has been sliced into segments or associated with an entire PDU not sliced into segments (hereinafter referred to as a "singleton"). In that regard, transport header feature 314 reads at least a portion of the initial segment or singleton to determine the communication protocol associated with the PDU. Transport header feature 314 then accesses a table (e.g. maintained in memory 330) to determine the encodings for the indicated communication protocol and selectively asserts bits 0-6 accordingly. Alternatively, transport header feature 314 may also access metadata associated with the PDU to make this determination.

In an example embodiment, a generic transport services header in the format of generic transport services header 400 is associated with a PDU segment, the PDU segment being part of a sequence of segments sliced by an IO endpoint prior to transportation across AS fabric 110. In that regard, transport header feature 314 selectively asserts bits 0-6 based on the relative position of a PDU segment to other PDU segments previously sliced by the IO endpoint. The segment sequence number is implied to be '0' in an initial segment and is incremented by '1' in each successive segment by transport header feature 314. The sequence number is wrapped back to 0 if the maximum value is reached and subsequent segments are still required to transport all of the data associated with the PDU.

In an example embodiment, the slicing of a PDU prior to transportation across AS fabric 110 may be performed by elements other than an IO endpoint. In that regard, the slicing of the PDU may occur in software on a compute agent responsive to AS fabric 110, or could occur in specialized hardware (e.g. an ASIC) responsive to AS fabric 110.

FIG. 5a is a table illustration of encodings for a transport services header, according to one embodiment of the invention. In FIG. 5a, table 510 is depicted as comprising example segmentation code encodings for generic transport services header 400 in bits 28-31.

FIG. 5b is a table illustration of granularity/endian (G/E) encodings for a transport services header, according to an embodiment of the invention. In FIG. 5b, table 520 is depicted as comprising example G/E encodings for generic transport services header 400 in bits 26 and 27.

Figure 6:
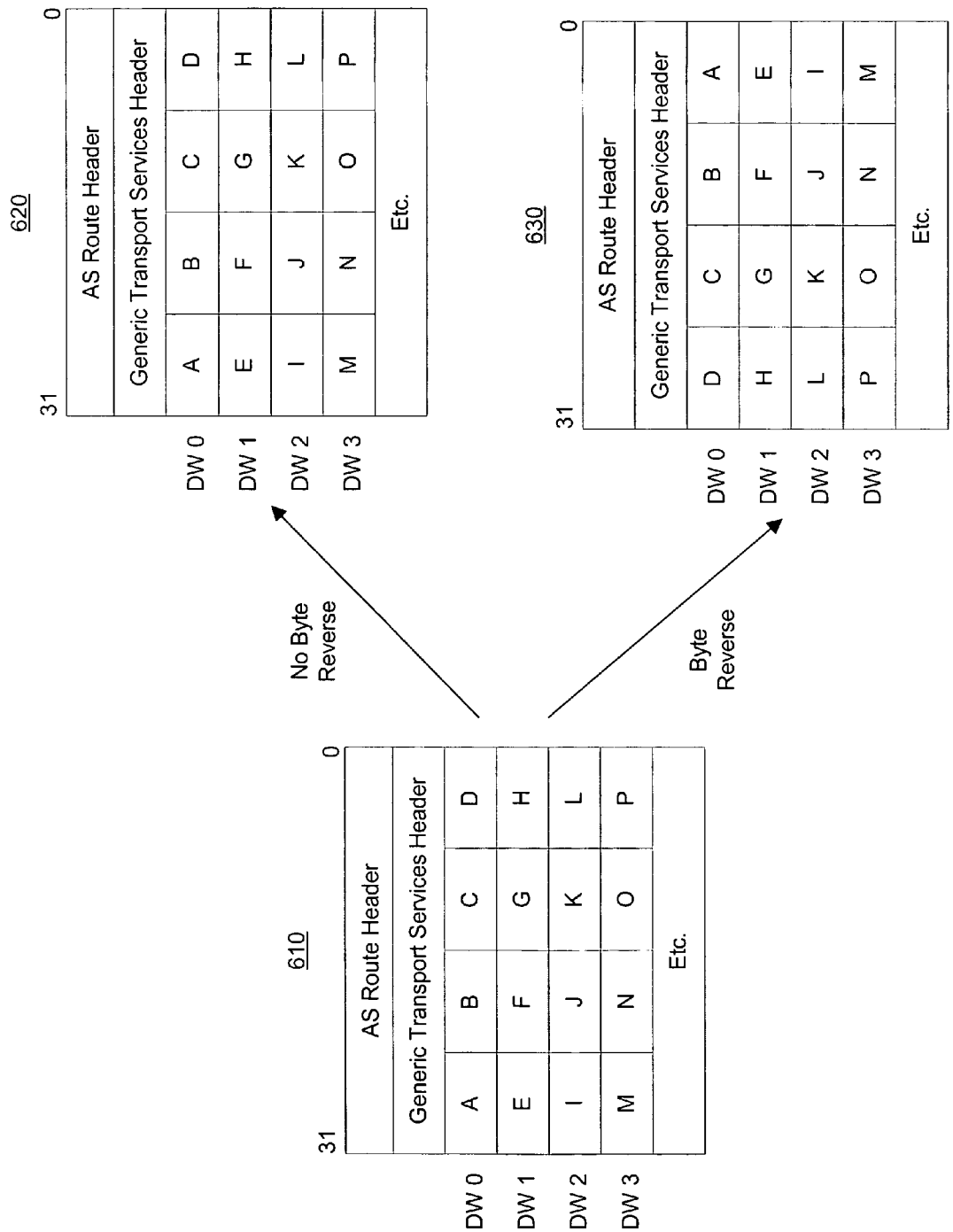
FIG. 6 is a graphical illustration of endian delivery options to a memory-based service interface, according to an embodiment of the invention.

FIG. 6 is a graphical illustration of endian delivery options to a memory-based service interface, according to an embodiment of the invention. In FIG. 6, block illustration 610 shows an example representation of an encapsulated PDU in a particular byte-stream order. Block illustrations 620 and 630 show examples of a no byte-reverse and byte-reverse delivery, respectively, of an encapsulated PDU originally in the order of block illustration 610.

As mentioned previously, bits 26 and 27 in a PI-generic transport services header in the format of generic transport services header 400 indicate the granularity and endian characteristics of an encapsulated PDU. In that regard, when an encapsulated PDU is received by an egress node (e.g. IO endpoint 120, 130 or 140) on a switch fabric (e.g. AS fabric 110), the egress node then reads bits 26 and 27 in the generic transport services header and based on the encodings shown in table 520 receives the encapsulated PDU into its memory-based service interface. It can be appreciated that alternative encodings, such as a bit to indicate the byte order of the packet and a bit to indicate that the contents should be byte-reversed if the byte order of the target differs from that of the packet, can be used to achieve the same results.

In an alternative embodiment, endian delivery options may be statically configured into an egress node so that encapsulated PDUs associated with a particular PI are byte-reversed based on a particular PI. In that regard, when an encapsulated PDU is received by a node, the egress node first determines what PI is associated with the encapsulated PDU and then receives the encapsulated PDU into its memory-based service interface according to a statically programmed configuration for that PI.

Figure 7:
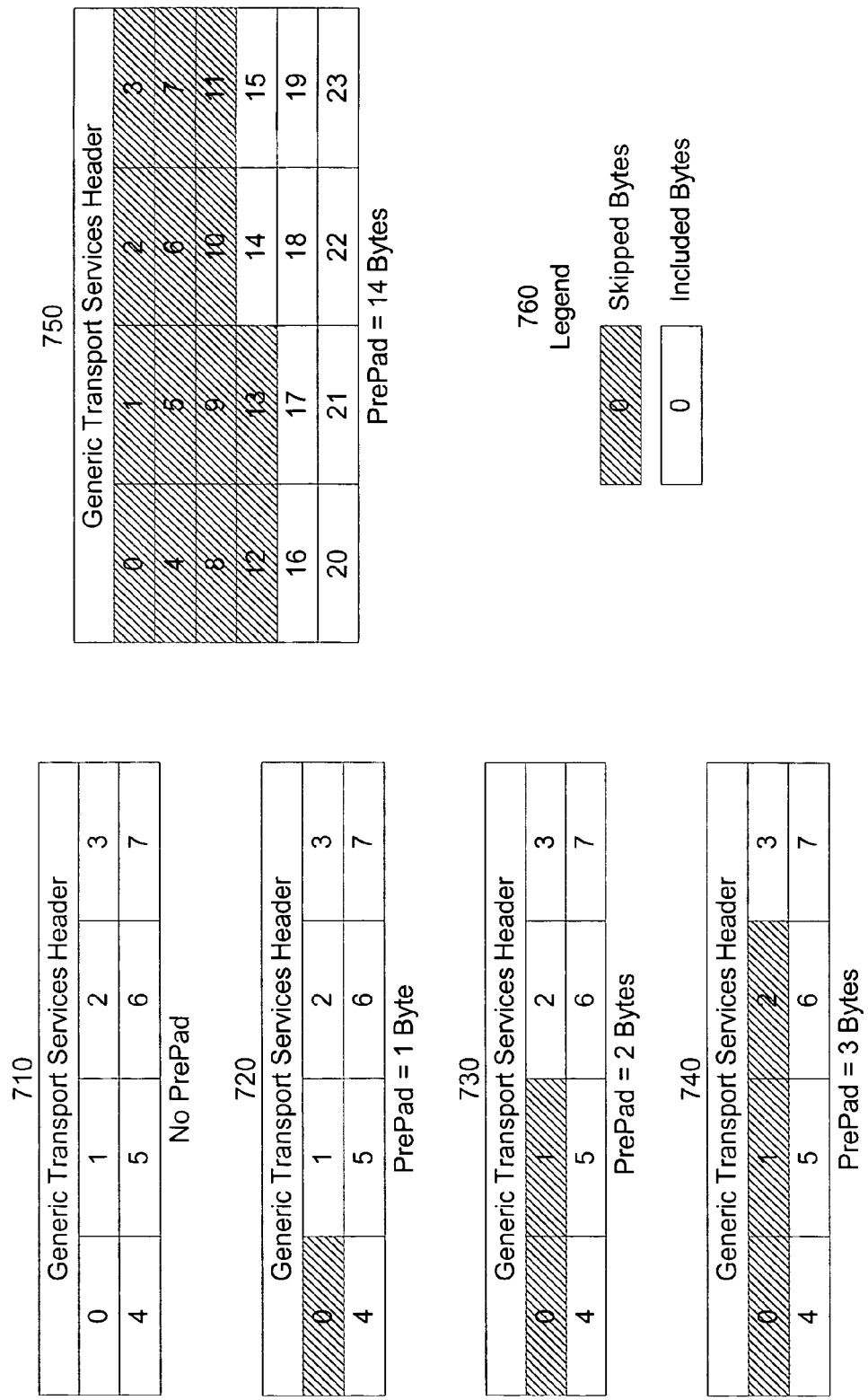
FIG. 7 is a graphical illustration of a PrePad delivery into a memory-based service interface, according an embodiment of the invention.

FIG. 7 is a graphical illustration of a PrePad delivery into a memory-based service interface, according an embodiment of the invention. In FIG. 7, block illustrations 710, 720, 730, 740 and 750 show different examples of PrePad portions of an initial or singleton segment associated with an encapsulated PDU. The PDU is encapsulated, for example, in the format of AS fabric carrier protocol 200.

In an example embodiment, "PrePad" is the process of off-setting an encapsulated PDU. PrePad facilitates an efficient delivery of the encapsulated PDU into a memory-based service interface or processing unit of an egress node on a switch fabric and efficient processing of the contents of the PDU. The size of the PrePad, measured in byte-count lengths, is based, at least in part, on what communication protocol is associated with a PDU when received at an ingress node on the switch fabric.

As mentioned previously, a generic transport services header in the format of generic transport services header 400 indicates in bits 28-31 if a PrePad is present in an initial or singleton segment. If the generic transport services header indicates a PrePad is present, then one or more bits of the first dword of the encapsulated PDU are selectively asserted. These selectively asserted bits will allow an egress node on a switch fabric to determine the byte-count length of the PrePad once the egress node determines that the generic transport services header indicates a PrePad is present in the initial or singleton segment.

In FIG. 7, block illustration 710 shows no PrePad. Block illustrations 720, 730, 740 and 750 show PrePads with 1, 2, 3 and 13 byte-count lengths, respectively. Legend 760 also illustrates a legend to highlight which bytes include a PrePad in the block illustrations of FIG. 7.

In an example embodiment, a PDU is received at IO endpoint 170. Transport engine 310 then invokes an instance of transport header feature 314. Transport header feature 314 reads at least a portion of the received PDU and may access additional information to determine what communication protocol is associated with the received PDU. Transport header feature 314, based in part on the determination, selectively asserts bits 28-31 in a generic transport services header in the format of generic transport services header 400 in the initial or singleton segment of the PDU to indicate whether the encapsulated PDU contains a PrePad.

In an example implementation, the communication protocol associated with the PDU may be Ethernet. The PDU associated with an Ethernet communication protocol consists of a 14 byte header followed by a payload of data. In this example implementation, the memory-based interface of an egress IO endpoint on AS fabric 110 operates more efficiently if protocol headers within encapsulated PDUs are delivered into a memory-based service interface on a 32-bit (4-byte) boundary.

If, for example, the Ethernet frame further encapsulates an IP header which further encapsulates a TCP header which further encapsulates an HTTP header, these three dword-oriented header formats will be delivered aligned on a 2-byte rather than 4-byte boundary resulting in less efficient accesses by a processor such as a network processor processing the protocols encapsulated within the Ethernet frame. As a result, if there is no PrePad for the Ethernet header, storage and/or processing inefficiencies may result if the PDU delivery associated with the Ethernet header begins at the $1^{st}$ byte rather than the $3^{rd}$ byte of a dword. Transporting an Ethernet frame within a transport services header utilizing a 2-byte PrePad aligns the Ethernet payload (e.g. IP) on a 4-byte boundary.

In that regard, bits 28-31 of the generic transport services header will indicate that a PrePad is present. Transport engine 310 then invokes delivery feature 316. Delivery feature 316 may read bits 0-6 of the generic transport services header to determine that the communication protocol associated with the PDU is Ethernet and then will access a table in memory (e.g. memory 330) containing the appropriate PrePad byte-count length corresponding to Ethernet. As mentioned above, the PrePad byte-count length for Ethernet is 2-bytes. Thus, information is placed in the first PDU dword (e.g. bits are selectively asserted) to allow an egress IO endpoint on AS fabric 110 to determine a PrePad byte-count length of 2-bytes. As mentioned above, a PrePad byte-count length of 2 will format the encapsulated PDU associated with an Ethernet communication protocol to allow for an efficient delivery of the protocols encapsulated within a PDU to the memory-based service interface of the egress node on a 32-bit boundary.

Figure 8:
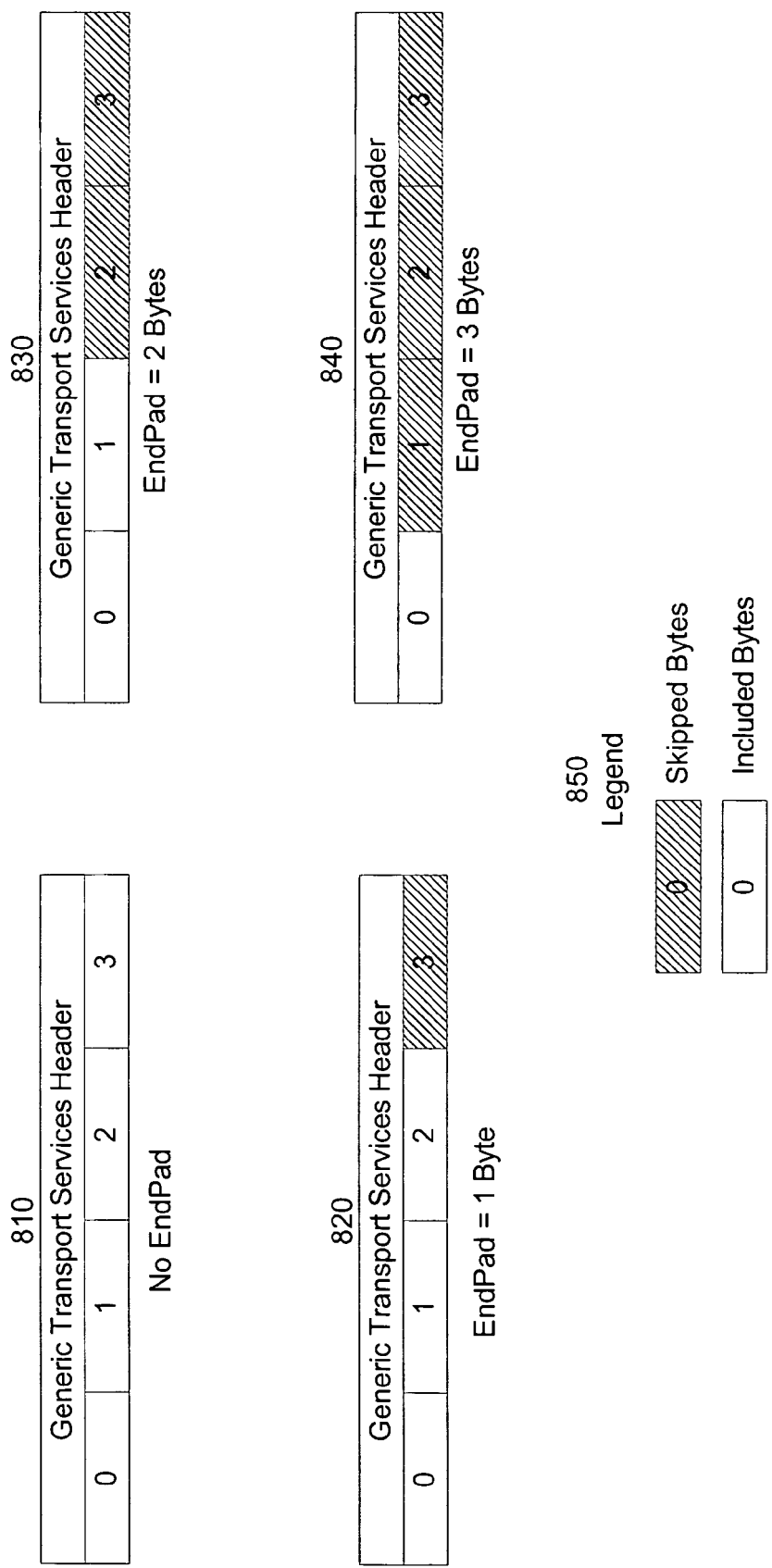
FIG. 8 is a graphical illustration of an EndPad delivery into a memory-based service interface, according an embodiment of the invention.

FIG. 8 is a graphical illustration of an EndPad delivery into a memory-based service interface, according an embodiment of the invention. In FIG. 8, block illustrations 810, 820, 830, and 840 show different examples of EndPad portions of a terminal or singleton segment associated with an encapsulated PDU. The PDU is encapsulated, for example, in the format of AS fabric carrier protocol 200.

In an example embodiment, "EndPad" is the process of skipping or ignoring the trailing bytes of a terminal or singleton segment associated with an encapsulated PDU. EndPad facilitates transportation of protocols carrying packets of a byte-arbitrary length across a fabric which transports only dwords. This is accomplished by indicating to the receiving egress nodes that one or more trailing bytes of the last dword in the encapsulated PDU are to be skipped when the terminal or singleton segment is delivered to a memory-based service interface of the node. The size of the EndPad, measured in byte-count lengths, is based, at least in part, on the number of trailing bytes in the last dword of a terminal or singleton segment associated with an encapsulated PDU that are not filled. In another embodiment EndPad indicates a larger range of bytes to skip or ignore and may not be limited to the last dword of the packet, to facilitate larger pad sizes.

As mentioned previously, a generic transport services header in the format of generic transport services header 400 indicates in bits 28-31 if an EndPad is present in a terminal or singleton segment. If the generic transport services header indicates an EndPad is present, then one or more bits of the last dword of the terminal or singleton segment associated with an encapsulated PDU are selectively asserted. An egress node on a switch fabric, after determining the generic transport services header indicates an EndPad is present, uses the selectively asserted bits in the last dword to determine the byte-count length of the EndPad and then skips or ignores one or more bytes in the last dword accordingly.

In FIG. 8, block illustration 810 shows no EndPad. Block illustrations 820, 830 and 840 show EndPads with 1, 2 and 3 byte-count lengths, respectively. Legend 850 also illustrates a legend to highlight which bytes include an EndPad in the block illustrations of FIG. 8.

In an example embodiment, a PDU is received at IO endpoint 170 and the PDU is a size that easily fits within the allowable payload size for an encapsulated PDU on AS fabric 110 in the encapsulation format of AS fabric carrier protocol 200. Thus, the encapsulated PDU is a singleton segment.

Transport engine 310 then invokes an instance of transport header feature 314. Transport header feature 314 reads at least a portion of the singleton segment or other information to determine its size. Transport header feature 314, based in part on the determination of the size, selectively asserts bits 28-31 in a generic transport services header in the format of generic transport services header 400 in the singleton segment of the PDU to indicate whether the encapsulated PDU contains an EndPad in order to allow for the delivery of the singleton with byte-accurate length.

Figure 9:
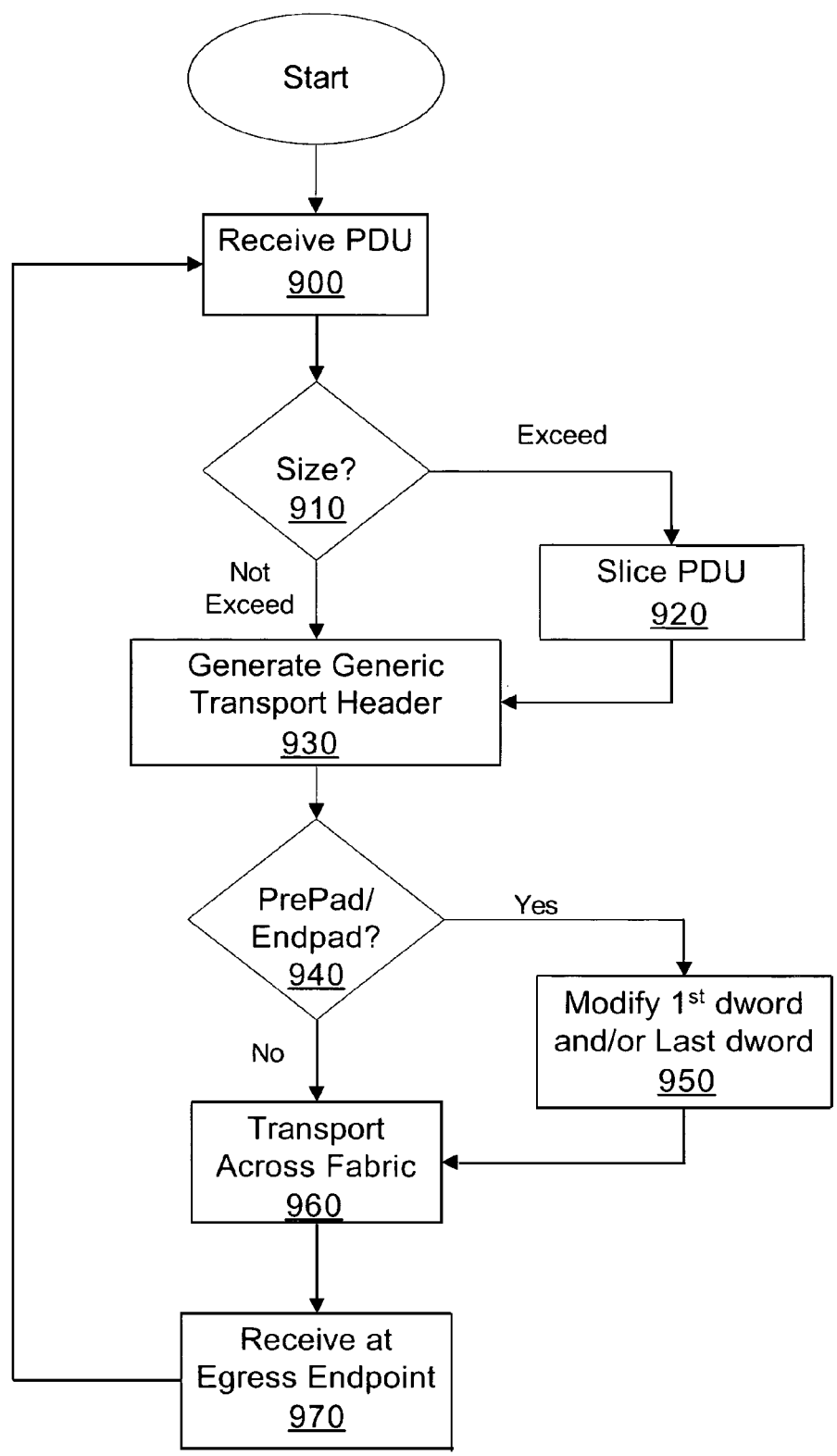
FIG. 9 is a flow chart of an example method to facilitate transmission of a PDU through a switch fabric to a memory-based service interface of a node on the switch fabric, according to one aspect of the invention.

FIG. 9 is a flow chart of an example method to facilitate transmission of a PDU through a switch fabric to a memory-based service interface of a node on the switch fabric, according to one aspect of the invention. The process begins in block 900, where according to an example embodiment, a PDU associated with a particular communication protocol (e.g. Ethernet, ATM, SONET, etc.) is received from device 170 over communication link 152 at IO endpoint 130 with a final destination for the PDU being device 160.

Once the PDU is received by IO endpoint 130, the process moves to block 910. In block 910, IO endpoint 130 determines whether the PDU exceeds the allowable size that can be transported across AS fabric 110 using an AS fabric carrier protocol in the format of AS fabric carrier protocol 200. If the PDU exceeds the allowable size, the process moves to block 920.

In block 920, IO endpoint slices the PDU into segments that are within the allowable size that can be encapsulated within the AS fabric carrier protocol. The process then moves to block 930.

In block 930, transport engine 310 invokes an instance of transport header feature 314. Transport header feature 314 reads at least a portion of the contents of either a segmented PDU or a singleton (non-segmented) PDU and may access other information and determines what bits to selectively assert in the fields contained in generic transport services header 220 in the format of generic transport services header 400. Transport header feature 314 then selectively asserts bits in the generic transport services header based on this determination. The process then moves to block 940.

In block 940, transport engine 310 invokes an instance of delivery feature 316. Delivery feature 316 reads bits 28-31 in the generic transport services header and other information such as PDU length and determines whether the PDU is to be formatted so that when encapsulated the PDU includes a PrePad and/or an EndPad. If the PDU includes a PrePad and/or an EndPad, the process moves to block 950.

In block 950, delivery feature 316 selectively asserts bits of the first dword of an initial or singleton PDU segment and/or the last dword of a singleton or terminal PDU segment. This selective assertion to provide information from which the receiving egress node can determine the PrePad and/or End-Pad byte-count length of an initial, singleton or terminal PDU segment. The process then moves to block 960.

In block 960, the segmented or singleton PDU is then transported across AS fabric 110 on AS communication links 114 according to the information contained within AS route header 210, as is to be by IO endpoint 120. The process then moves to block 970.

In block 970 IO endpoint 120 reassembles the PDU, if segmented, and prior to delivery to its memory-based service interface, skips or ignores any PrePads and/or EndPads and removes all AS specific encapsulation protocols. Some information, such as PDU communication protocol type and packet length, may be preserved and communicated along with the PDU. The PDU is then accessible for transmission to device 160 via communication link 156 through the memory-based service interface of IO endpoint 120. Accessibility may be, for example, access to a memory controller interface associated with a receive and/or transmit buffer that is responsive to or located within IO endpoint 120. The process then starts over for the next PDU received at an IO endpoint on AS fabric 110.

Referring again to the illustration of electronic system 100 in FIG. 1. In FIG. 1 electronic system 100 may be a media server, storage server, telecommunications server, switch or router for a communication network, although the invention is not limited to these embodiments.

Devices 160, 170 and 180 may be either directly or remotely connected to AS fabric 110 through communication links 152, 154, and 156. Direct connections may be via point-to-point communications links utilizing communication standards such as Ethernet, SONET, asynchronous transfer mode (ATM) or the like. Remote connections may be via wireless communication links utilizing such wireless communication standards as 802.11 and/or 802.16 or the like.

Devices 160, 170 and 180 also represent elements of electronic system 100 that may be either a source or a destination for data transmitted within electronic system 100. In that regard, devices 160, 170 and 180 may well comprise one or more of a media blade, a switch blade, a compute blade or a storage blade.

As used, herein, IO endpoints 120, 130 and 140 represent elements of electronic system 100 which act as an either an input (ingress) or output (egress) node for AS fabric 110. As used herein, IO endpoints 120, 130 and 140 are intended to represent any of a number of hardware and/or software element(s) to receive and transmit data. In this regard, according to one example embodiment, IO endpoints 120, 130 and 140 may well comprise one or more of a bridge, a microprocessor, network processor, software application, embedded logic, or the like.

As mentioned above, transport services manager 300 may be encompassed within IO endpoints 120, 130 and 140. Alternatively, transport services manager 300 may well be communicatively coupled to IO endpoints 120, 130 and 140 through AS communication links 114.

According to one example embodiment, transport services manager 300's generation of a transport services header to facilitate encapsulation and transportation of a PDU through AS fabric 110 to deliver the PDU to a memory-based service interface on an egress IO endpoint may well be implemented in hardware, software, firmware, or any combination thereof. In this regard, transport services manager 300 may well be implemented as one or more of an ASIC, special function controller or processor, FPGA, other hardware device and firmware or software to perform at least the functions described herein.

In the previous descriptions, for the purpose of explanation, numerous specific details were set forth in order to provide a thorough understanding of the invention. It will be apparent, however, to one skilled in the art, that the invention can be practiced without these specific details. In other instances, structures and devices were shown in block diagram form in order to avoid obscuring the invention.

References made in the specification to "one embodiment" or "an embodiment" means that a particular feature, structure or characteristic described in connection with that embodiment is included in at least one embodiment of the invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

What is claimed is:

1. A method comprising:
   receiving at a node on a first communication link a protocol data unit (PDU); and
   generating a header to deliver the PDU to a memory-based service interface of another node on a second communication link, wherein generating the header includes:
   reading at least a portion of the received PDU to determine a communication protocol associated with the received PDU and generating at least a portion of the header based on that determination, the at least a portion of the header to indicate whether a PrePad byte is to be inserted in one or more dwords of the PDU and whether the PDU is to be delivered to the memory-based service interface in a byte-reverse manner.

2. A method according to claim 1 further comprising:
   segmenting the PDU such that each segment fits into a communication unit;
   encapsulating each segment of the PDU to include the header; and
   indicating the segment type in the header.

3. A method according to claim 1, wherein the PDU contains data transmitted by a first device communicatively coupled to the node, the data to be received by a second device communicatively coupled to the other node.

4. A method according to claim 3, wherein the PDU is received by the second device in the same communication format as transmitted by the first device.

5. A method according to claim 1, wherein generating the header further includes:
   generating at least a portion of the header based on metadata included with the received PDU, the metadata indicating an interface associated with the first communication link.

6. A method according to claim 1, wherein generating the header further includes:
   in the last dword of the PDU based on the number of bytes that will not be filled by the PDU when delivered to the memory-based service interface of the other node.

7. A method according to claim 1, wherein the communication link comprises a switch fabric operating in compliance with the Advanced Switching Core Specification.

8. A method according to claim 1, wherein the memory-based service interface comprises a memory-based service interface for a transmit/receive buffer responsive to the other node.

9. A method according to claim 8, wherein the transmit/receive buffer comprises a first-in-first-out buffer (FIFO).

10. A method according to claim 1, wherein the memory-based service interface comprises data structures in a shared memory responsive to the node and the other node.

11. An apparatus comprising:
    a node on a communication link; and
    a transport services manager responsive to the node to generate a header for a protocol data unit (PDU) received by the node, the header to deliver the PDU to a memory-based service interface of another node on the communication link, wherein to generate the header includes:
    the transport services manager to read at least a portion of the received PDU to determine a communication protocol associated with the received PDU; and
    the transport service manager to generate at least a portion of the header based on that determination, the at least a portion of the header to indicate whether a PrePad byte is to be inserted in one or more dwords of the PDU and whether the PDU is to be delivered to the memory-based service interface in a byte-reverse manner.

12. An apparatus according to claim 11, wherein the communication link is a switch fabric operated in compliance with the Advanced Switching Core Specification.

13. An apparatus according to claim 11 further comprising:
    a memory coupled to the node to store communication protocol identification information, wherein the memory is accessed by the transport services manager to determine what communication protocol is associated with the received PDU and based on that determination generate at least a portion of the header.

14. An apparatus according to claim 11, the apparatus further comprising:
    a memory to store executable content; and
    control logic, communicatively coupled with the memory, to execute the executable content, to implement an instance of the transport services manager.

15. An apparatus according to claim 14, wherein the control logic comprises control logic implemented in a network processor.

16. A system comprising:
    a communication link;
    a node including volatile memory; and
    a transport service manager responsive to the node to generate a header for a protocol data unit (PDU) received by the node, the header to deliver the PDU to a memory-based service interface of another node on the communication link, wherein to generate the header includes:
    the transport services manager to read at least a portion of the received PDU to determine a communication protocol associated with the received PDU; and
    the transport service manager to generate at least a portion of the header based on that determination, the at least a portion of the header to indicate whether a PrePad byte is to be inserted in one or more dwords of the PDU and whether the PDU is to be delivered to the memory-based service interface in a byte-reverse manner.

17. A system according to claim 16, wherein the communication link is a switch fabric operated in compliance with the Advanced Switching Core Specification.

18. A system according to claim 16, wherein the volatile memory contains communication protocol information for determining what communication protocol is associated with the received PDU.

19. A system according to claim 18, wherein the volatile memory is accessed by the transport services manager to determine what communication protocol is associated with the received PDU and based on that determination, the transport services manager generates at least a portion of the header.

20. A machine readable medium comprising machine readable instructions which, when executed by a node on a communication link causes the node to:
receive a protocol data unit (PDU);
generate a header, the header to deliver the PDU to a memory-based service interface of another node on the communication link, wherein to generate the header includes:
the node to read at least a portion of the received PDU to determine the communication protocol associated with the received PDU; and
the node to generate at least a portion of the header based on that determination, the at least a portion of the header to indicate whether a PrePad byte is to be inserted in one or more dwords of the PDU and whether the PDU is to be delivered to the memory-based service interface in a byte-reverse manner.

21. A machine readable medium according to claim 20 further comprising:
the node segmenting the PDU such that each segment fits into a communication unit of the communication link;
the node encapsulating each segment of the PDU to include the header; and
the node inserting an indication of the segment type in the header.

22. A method comprising:
receiving a protocol data unit (PDU) associated with a given communication protocol at a node on a first communication link;
generating a header to deliver the PDU to a memory-based service interface of another node on a second communication link;
modifying at least a portion of the PDU, said modifying including inserting one or more PrePad bytes in one or more dwords of the PDU based on what given communication protocol is associated with the PDU when received at the node; and
indicating the modification in the header.

23. A method according to claim 22, wherein the given communication protocol is Ethernet.

24. A method according to claim 22, wherein to modify the at least a portion of the PDU comprises inserting one or more EndPad bytes in the last dword of the PDU based on the number of bytes that will not be filled by the PDU when delivered to the memo s-based service interface of another node.

25. A method according to claim 22, wherein at least a portion of the header indicates whether the PDU is to be delivered to the memory-based service interface of another node in a byte-reverse manner.

26. A method according to claim 22, further comprising:
segmenting the PDU such that each segment fits into a communication unit; encapsulating each segment of the PDU to include the header; and indicating the segment type in the header.

27. A method according to claim 26, wherein the second communication link comprises a switch fabric operating in compliance with the Advanced Switching Core Specification.

28. A method according to claim 27, wherein the header comprises the header including an indication of segmentation and reassembly transport services for the encapsulated PDU.

29. A method according to claim 22, wherein the memory-based service interface comprises a transmit/receive buffer responsive to another node.

30. A method according to claim 22, wherein the memory-based service interface comprises data structures in a shared memory responsive to the node and another node.

* * * * *

UNITED STATES PATENT AND TRADEMARK OFFICE
CERTIFICATE OF CORRECTION

PATENT NO. : 7,573,879 B2
APPLICATION NO. : 10/934271
DATED : August 11, 2009
INVENTOR(S) : Narad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Seventh Day of September, 2010

David J. Kappos
*Director of the United States Patent and Trademark Office*